Patented Sept. 26, 1950

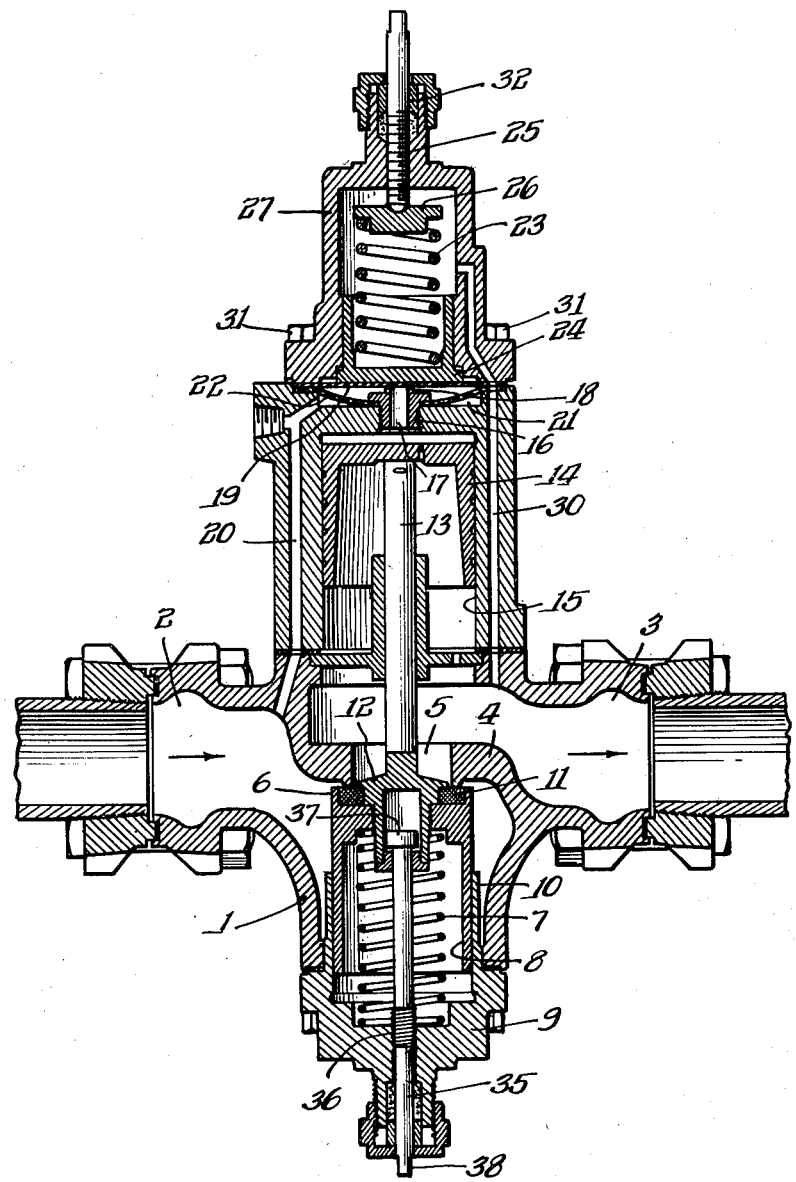

2,523,826

UNITED STATES PATENT OFFICE 2,523,826

BACK PRESSURE REGULATOR VALVE

Charles J. Heinzelman, Antioch, Ill., assignor to Hubbell Corporation, Chicago, Ill., a corporation of Illinois Application October 21, 1944, Serial No. 559,823

2 Claims. (Cl. 137—153)

This invention relates to refrigerating apparatus, and it is particularly concerned with a back pressure regulator valve for use therein.

One object of the invention is to provide a new and improved valve device for regulating the flow of refrigerant from the evaporator to the compressor.

Another object of the invention is to provide a back pressure regulator valve operable in response to the difference in pressure as between the inlet side of the valve which communicates with the evaporator of the system and the pressure at the outlet side which is connected to the compressor.

It is also an object of the invention to provide a back pressure regulator valve for refrigerating systems suitable for use in a system operating below atmospheric pressure.

More specifically, the invention comprises a valve chamber interposed between the evaporator and the compressor of a refrigerating system with a main valve therein and a piston and cylinder device engaged with the valve for actuating it, the cylinder including a pilot port controlled by a diaphragm which is subject at one side to the pressure of the fluid coming from the evaporator, and at the other side to the pressure in the line leading to the compressor.

Other objects and advantages of the invention will appear from the following description taken in connection with the drawing which is a vertical sectional view of a back pressure regulator valve structure embodying the invention showing the valve in closed position, the section being taken axially with respect to the inlet and outlet passages of the valve chamber, and also with reference to the actuating piston for the valve.

While there is illustrated in the drawing and hereinafter described, a preferred form of the invention, it is contemplated that various modifications may be made by those skilled in the art without departing from the spirit and scope of the appended claims.

The structure shown in the drawing includes a main valve casing 1 having an inlet passage 2 and an outlet passage 3 with a partition 4 between said passages. Connection between the inlet passage 2 and the outlet passage 3 is afforded by a port 5 in the partition 4, but this port is kept normally closed by a valve 6 which is yieldingly seated by a spring 7 mainly accommodated in the hollow cylindrical body 8 of the valve 6. The spring reacts between the head of the cylindrical body 8 and a cap 9 which is secured to the casing 1, and provides a cylindrical guide 10 for the body 8 of the valve.

The valve includes a renewable annular seating portion 11 which is held in a recess in the head of the valve body by means of a flanged plug 12. The plug is engaged with the lower end of a valve stem 13 and this stem, at its upper end, engages the head of a piston 14 guided in a cylinder 15 attached to the casing 1 opposite the port 5. Preferably, to eliminate any possibility of binding of the parts in operation, the stem 13 is not actually connected either to the piston 14 or to the plug 12 of the valve, the ends of the stem 13 being finished square with its axis and simply abutting the smooth finished surfaces provided for this purpose on the piston and plug, respectively. The stem is adequately guided intermediate its ends, as shown. The head of the cylinder 15 is fitted with a bushing 16 in which there is formed a pilot port 17, the upper end of said port being formed as a valve seat 18 which is normally closed by a diaphragm 19. A duct 20 leads from the inlet passage 2 to a shallow space 21 under the diaphragm 19 so that when the pressure in the inlet passage 2 reaches a predetermined value it operates to lift the diaphragm 19, uncovering the pilot port 17 and admitting the pressure into the upper end of the cylinder 15. This pressure operating against the head of the piston 14 and through the stem 13 opens the valve 6 in opposition to the spring 7. In this way a predetermined pressure is maintained on the inlet passage 2, while the pressure in the outlet passage 3 will be operative at any value providing it is lower than the inlet pressure by the amount of a predetermined differential, usually adjusted to about two pounds.

As shown, the structure includes a screen 22 disposed in the space 21 to protect the pilot port 17.

The diaphragm 19 is held normally seated over the pilot port 17 by means of a spring 23 reacting against the head of a hollow piston 24, said head bearing directly upon the diaphragm 19. The strength of the spring 23 may be adjusted by means of a screw 25 which impinges against a plug 26 in the end of the spring 23 and is threaded into the upper end of a housing 27 bolted to the upper end of the cylinder 15. The range of movement of the diaphragm 19 and piston 24 is relatively short, but the pressure to which the diaphragm will respond may be varied considerably by adjustment of the screw 25.

In a refrigerating system which is operated at positive pressures, that is, at pressures above atmospheric, the structure thus far described will be sufficient for causing the diaphragm 19 to respond to a pressure in the inlet passage somewhat greater than the pressure in the outlet passage. However, when the system is operated at sub-atmospheric pressure—in other words under partial vacuum—then the pressures in the inlet 2 and outlet passage 3 may be both below atmospheric pressure and, notwithstanding the differential between these two, the diaphragm 19 would not respond if it were subject at its upper side to atmospheric pressure.

Therefore, in the present structure, a duct 30 connects the outlet passage 3 with the space in the housing 27 above the diaphragm and its pressure piston 24. This space is effectively sealed from the outside atmosphere by the clamping of the housing onto the cylinder 15 by means of suitable bolts 31, with the marginal portions of the diaphragm 19 and screen 22 interposed; and the upper end of the housing 27 is sealed by suitable packing 32 surrounding the stem of the adjusting screw 25. Accordingly, the unit pressure in the housing 27 to which the diaphragm and its piston 24 are subjected is the same as the unit pressure in the passage 3, whereas the pressure reacting against the under side of the diaphragm 19 through the duct 20 is substantially the same as that in the inlet passage 2. When the difference between these pressures reaches a predetermined value it will, therefore, operate to lift the diaphragm 19 from the seat 18 and connect the port 17 and cylinder 15 with the duct 20. If the cylindrical surface of the piston 24 provides an effective seal in the housing 27 the pressure admitted through the duct 30 will actually act against the piston 24 by which it will be transmitted mechanically to the diaphragm 19. The effective areas upon which the respective pressures will operate through ducts 20 and 30 will be substantially equal in the arrangement shown, but the pressure tending to hold the diaphragm against the seat 18 of the port 17 will be supplemented by the adjusted pressure of the spring 23 representing substantially the differential required to operate the main valve 6.

Occasionally it is desirable to open the valve manually and for this purpose there is provided a headed stem 35 threaded into the cap 9 at 36 and having its head 37 swively engaged with the lower end of the plug 12 which is rigidly secured in the body of the main valve. The lower end 38 of the stem 35 is squared or flattened so that it may be engaged or turned by a suitable key or wrench whereupon its threaded bearing 36 in the cap 9 will cause it to be moved longitudinally for withdrawing the valve 6 from its seat over the port 5. By this adjustment the valve may be held open as long as desired, and then released to its normal closed position.

I claim as my invention:

1. In a back pressure regulator for refrigerating systems operating at sub-atmospheric pressure, said regulator comprising a valve chamber having an inlet passage and an outlet passage with a partition therebetween having a port, a normally seated main valve controlling said port, spring means yieldingly holding said main valve to its seat, a first cylinder provided with a first sleeve type piston having one end closed therein, a valve stem having loose contact at one end with the closed end of said piston and loose contact at its other end with said main valve, an inlet port in the end of said cylinder farthest removed from the main valve and in alinement with the axis of the main valve, a second cylinder in axial alinement with the axis of the inlet port, a second piston in said second cylinder, spring means in the second piston for normally urging the second piston into position to close said inlet port, means for adjusting the tension of said last mentioned spring means, a duct leading from the inlet passage of the valve chamber to a space between the second piston and the first cylinder whereby pressure acting through said duct moves the second piston to open said inlet port and move the first piston to open said main valve, a second duct leading from the outlet passage into the second cylinder at the end of the second piston opposite the first duct and subjecting the second piston to the pressure of the outlet passage whereby when the outlet pressure plus the pressure of the spring acting on the second piston exceeds the inlet pressure the second piston will close said inlet port, said second cylinder being sealed against external atmospheric pressure.

2. A back pressure regulator as claimed in claim 1, including a flexible diaphragm between said inlet port and said second piston, said diaphragm normally lying flat over the inlet port on one face and receiving the thrust of the second piston on the other face.

CHARLES J. HEINZELMAN.

REFERENCES CITED

The following references are of record in the file of this patent:

UNITED STATES PATENTS

| Number | Name | Date |
|---|---|---|
| 738,161 | Christensen | Sept. 8, 1903 |
| 1,098,616 | Creveling | June 2, 1914 |
| 1,487,402 | Roucka | Mar. 18, 1924 |
| 1,612,567 | Browne | Dec. 28, 1926 |
| 1,753,529 | Oliphant | Apr. 8, 1930 |
| 1,958,262 | Boland | May 8, 1934 |
| 2,354,283 | St. Clair | July 25, 1944 |
| 2,374,568 | Terry | Apr. 24, 1945 |

FOREIGN PATENTS

| Number | Country | Date |
|---|---|---|
| 705,690 | Germany | May 7, 1941 |